United States Patent [19]

Kunii et al.

[11] Patent Number: 5,434,968
[45] Date of Patent: Jul. 18, 1995

[54] IMAGE DATA PROCESSING DEVICE WITH MULTI-PROCESSOR

[75] Inventors: Tosiyasu Kunii, Tokyo; Satoshi Nishimura, Irima; Ryo Mukai, Shizuoka, all of Japan

[73] Assignee: Kubota Corporation, Osaka, Japan

[21] Appl. No.: 188,359

[22] Filed: Jan. 27, 1994

Related U.S. Application Data

[63] Continuation of Ser. No. 835,615, Feb. 13, 1992, abandoned.

[30] Foreign Application Priority Data

Sep. 10, 1991 [JP] Japan .................. 3-230564

[51] Int. Cl.⁶ .............................. G06F 15/16
[52] U.S. Cl. ............................ 395/163; 395/162; 395/164
[58] Field of Search ................... 395/162–166, 395/157, 650, 800; 345/185, 196; 364/200 MS

[56] References Cited

U.S. PATENT DOCUMENTS

| | | | |
|---|---|---|---|
| 4,737,921 | 4/1988 | Goldwasser et al. | 395/163 |
| 4,752,894 | 6/1988 | Deering et al. | 395/109 |
| 4,985,856 | 1/1991 | Kaufman et al. | 395/164 |
| 5,113,180 | 5/1992 | Gupta et al. | 340/747 |

OTHER PUBLICATIONS

Nishimura, Satoshi; Mukai, Ryo; Kunii, Tosiyasu, Back cover page of the paper entitled "A Flexible Parallel Graphics Architecture Based on a Conflict-Free Multiport Frame Buffer", Department of Information Science, University of Tokyo, Hongo, Japan, Mar. 12–14, 1991, previously submitted with Feb. 13, 1992 information disclosure statement.

[Translation] Listing of Lectures, 42nd National Convention, Information Processing Academic Congress, Tokyo Engineering Institute, Mar., 1991.

Primary Examiner—Mark R. Powell
Assistant Examiner—Kee M. Tung
Attorney, Agent, or Firm—Spensley Horn Jubas & Lubitz

[57] ABSTRACT

An image data processing device having a multi-processor includes a plurality of local frame buffers, each coupled to a different one of a plurality of processors, and an image mixing device for mixing image data outputted from the local frame buffers periodically and transferring the mixed data to a screen, Each of the local frame buffers includes a demand paging device for assigning a memory unit of predetermined size to only a portion of the screen accessed by one of the plurality of processors to which the local frame buffer is coupled. The demand paging device includes a patch table for storing an assigning situation for the rectangular areas of the screen, Each patch of the patch table corresponds to the rectangular area of the screen, and stores information regarding an access to a portion of the screen by the one of the plurality of processors and address information of a memory unit assigned to the portion of the screen accessed by the one of the plurality of processors.

16 Claims, 3 Drawing Sheets

IMAGE DATA PROCESSING DEVICE WITH MULTI-PROCESSOR

This is a file wrapper continuation of application Ser. No. 07/835,615 filed on Feb. 13, 1992, now abandoned.

BACKGROUND OF THE INVENTION

1. Prior Art

The present invention relates to image data processing devices for generating graphic images using a plurality of processors for image data processing.

2. Description of the Prior Art

In case of parallel generating of graphic images using a multi-processor system, it is necessary for every processor to access to a frame buffer when each processor outputs calculated image data to a screen. Also, in the case of multi-window systems in which each window is processed by each previously assigned processor, it is required for every processor to access to the frame buffer as well as the multi-processor systems. The above type structure in which every processor shares one frame buffer causes access conflicts to the frame buffer, resulting in performance reduction.

A conventional image data processing system is such that a whole screen is divided into non-overlapping areas corresponding to the number of processors, and each processor is assigned to a frame buffer corresponding to each area, to resolve the access-conflict-problem.

However, the above mentioned conventional image data processing system lacks unlimited access ability for every processor, i.e., each processor's accessible area is limited to a specified one. This causes increasing of data communication volume between processors in running various types of application software, resulting in performance reduction.

For example, assume that a shaded image is generated by the Z-buffer method from a model formed by many polygons. Each processor is accessible to only a specified area of the frame buffer so that the processor is in charge of the specified area in image generating. However, it is not clear which area of the frame buffer each polygon occupies, so that each processor can't decide which polygon shape information should be fetched from a memory for itself. Therefore, every processor must refer to every polygon shape data. Supplying the shape data to every processor requires broadcast communication. However, the communication time is so constant not depending on the number of processors that increasing processors causes performance saturation because of tight communication time.

SUMMARY OF THE INVENTION

It is therefore an object of the present invention to provide an image data processing device with a multi-processor having such ability that every processor can access to any area of a frame buffer.

In accordance with the present invention, an image data processing device having a multi-processor, comprises a plurality of processors for processing image data, a plurality of local frame buffers, each coupled to a different one of the processors, display means for displaying the processed image data on a screen thereof, and, image mixing means for mixing image data outputted from the local frame buffers periodically and transferring the mixed data to the display means, wherein each of the plurality of local frame buffers includes demand paging means for assigning a memory unit of predetermined size to only a portion of the screen accessed by one of the plurality of processors to which the local frame buffer is coupled.

In the multi-processing system, it is admitted that most accesses by each processor are directed to a local area on the screen. Therefore, the sum of the size of assigned memory units is apparently less than the size of a conventional frame memory. Each processor has an individual local frame buffer so that it is not limited in terms of access areas.

In an image processing device with a patch table, each patch memorizes whether the rectangular area on the screen corresponding to the patch is accessed or not, and the memory unit address corresponding to the accessed rectangular area. When any local frame buffer is accessed by the processor connected thereto, the patch corresponding to the accessed area is tested. If the patch has already memorized the assigned situation, the processor accesses to the assigned memory unit to read data therefrom. If the patch is in the non-assignment situation, a new memory unit is assigned to the patch.

DETAILED DESCRIPTION OF THE PREFERRED EMBODIMENTS

Figure 1:
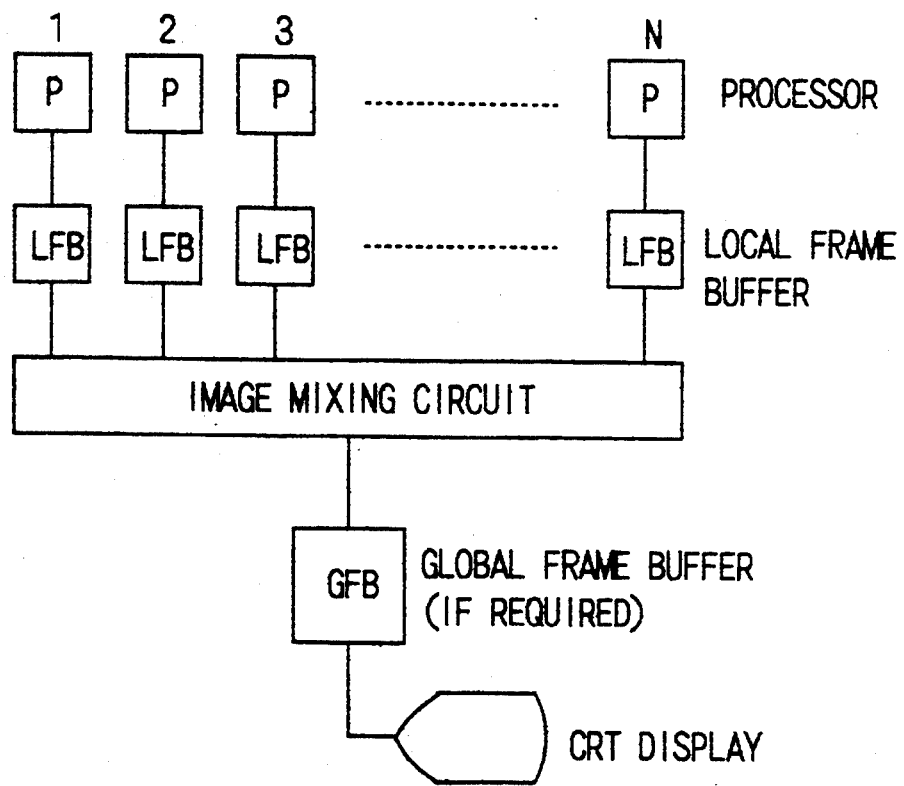
FIG. 1 is a block diagram showing a whole configuration of an image data processing device embodying the present invention.

FIG. 1 is a block diagram showing a whole configuration of an image data processing device embodying the present invention.

Processors P are provided for processing image data, with each being connected to a local frame buffer LFB. Each LFB is connected to an image mixing circuit which is connected to a global frame buffer GFB. A CRT display is connected to the GFB. The GFB may be provided to prevent performance deterioration which occurs when each processor has a weak access characteristic to an LFB, resulting in an LFB overflow, i.e., lack of free pages in an image memory.

Figure 2:
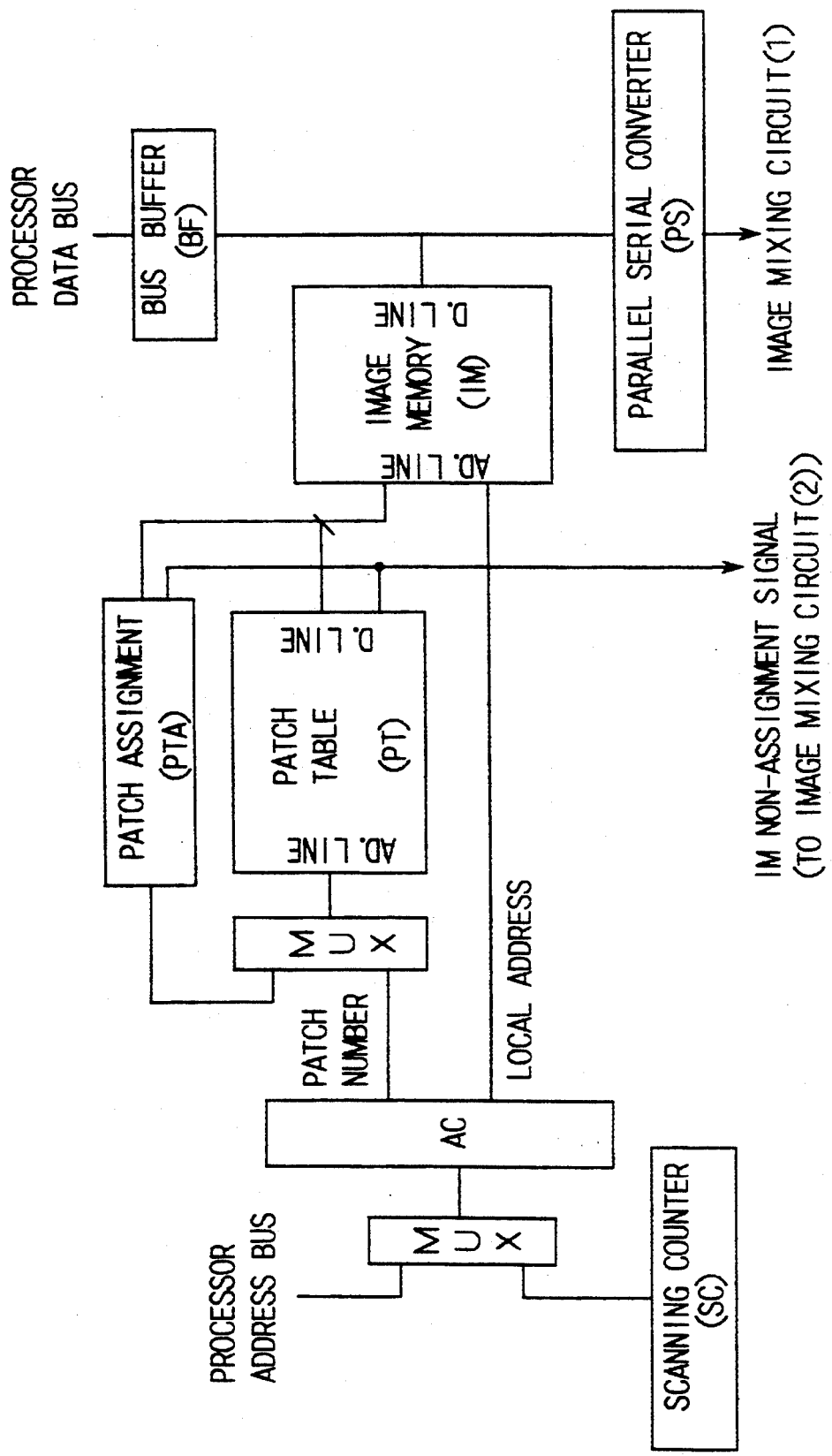
FIG. 2 is a block diagram of the local frame buffer LFB.

FIG. 2 is a block diagram of the local frame buffer LFB.

The local frame buffer LFB has a configuration similar to the demand-paging configuration in well known virtual memory systems, in terms of the local accessing characteristic of every processor, as stated above. That is, a portion of the image memory is only assigned to an actual accessed area of the screen, thus the amount of memory being saved.

A multiplexer MUX connected to a processor-address-bus serves to switch an address bus and scanning counter SC is provided for counting pixels in the scanning direction of the screen.

The screen is divided into a plurality of small rectangular areas, and in the local frame buffer LFB a memory unit of a specified size allocated from the image memory is assigned to the actual accessed area on the screen. The predetermined size of the memory unit corresponds to each of the rectangular areas. A patch table PT formed by a random access memory consists of a plurality of patches with each patch corresponding to the rectangular area. The patch stores an assigning situation for the rectangular area. That is, each patch has a flag for storing presence or absence information of an access to a portion on the screen by the processor and a memory area for storing address information of a memory unit assigned to the portion on the screen. The address information is formed by address data of an upper-left corner pixel on the accessed rectangular area on the screen.

An address converter AC serves to change address data on the screen supplied from the processor address bus and address data supplied from the scanning counter SC into a patch number and local address data in the memory unit according to the patch specified by the patch number. The patch number is supplied to an address line of the patch table PT, the local address data being supplied to an address line of the image memory IM. The address converter AC is provided for calculating a patch number and local address data based on the address data on the screen, as stated above. If each patch size can be represented by exponentiation of two, no particular circuit is required.

A patch assignment circuit PTA is a circuit which assigns the memory unit of the image memory IM to the patch actually accessed. In this example, a special circuit for the patch assignment is provided. It is available to realize the patch assignment by a software routine including an interruption step to a processor.

A data line of the image memory IM is connected to a buss buffer BF for writing data provided by a processor into the image memory IM through the bus buffer. In a read timing, image data is read from a parallel-serial converter PS connected to the data line of the image memory IM, and is thereby outputted to a terminal 1 of an image mixing circuit described later. The patch assignment circuit PTA and the patch table PT has an IM non-assignment signal line to a terminal 2 of the image mixing circuit. When no patch assignment to an address accessed by the scanning counter SC is detected in the reading timing, the IM non-assignment signal line is activated.

In the above mentioned configuration, when any access from the processor to the frame buffer occurs, the address bus of the processor is connected to the address converter AC. After that, a patch number is obtained by decoding the inputted address data and tested to determine whether any memory unit of the image memory IM is already assigned to the patch of the patch number. If assigned, the address of the image memory IM corresponding to the assigned patch is decoded and data on the processor data bus is written into the area of the address of the image memory IM through the bus buffer BF. Otherwise, if no memory unit of the image memory IM is assigned to the patch of the patch number, a new memory unit of the image memory IM is assigned to the patch. Therefore the data can be written into the image memory IM.

Figure 3:
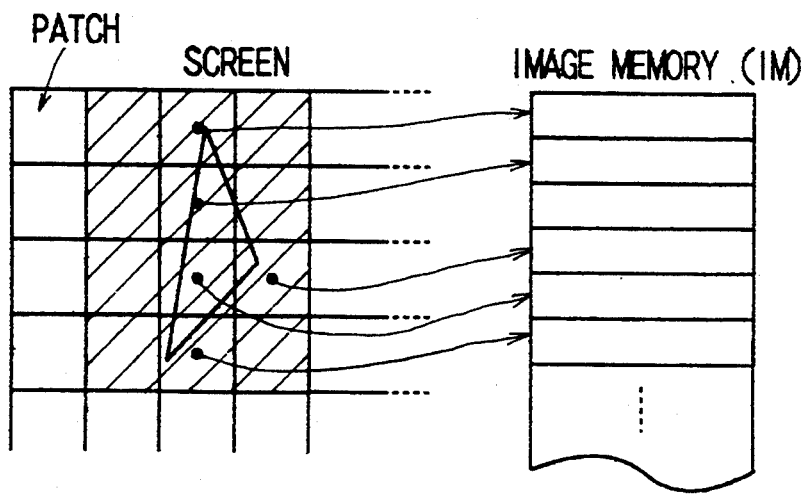
FIG. 3 illustrates an example of an assigned situation in which portions of the image memory IM are assigned to several patches.

FIG. 3 illustrates an example of an assigned situation in which memory units of the image memory IM are assigned to several patches on the screen. As shown in the figure, accessing to the local area on the screen illustrated by hatching allows the number of the memory units used for the local frame buffer to be considerably smaller.

The local frame buffer LFB is successively read by the scanning counter SC in the scanning direction to feed it to the image mixing circuit. At this time, the address converter AC is connected to the scanning counter SC by switching. In addition to the accessing from the processor, after calculating the address in the image memory IM, data is read from the image memory IM. When the scanning counter SC is directed to any non-assigned patch, an IM non-assigned signal, which represents that there is no data at the address, is outputted to the terminal 2 of the image mixing circuit in place of a new patch assignment.

Figure 4:
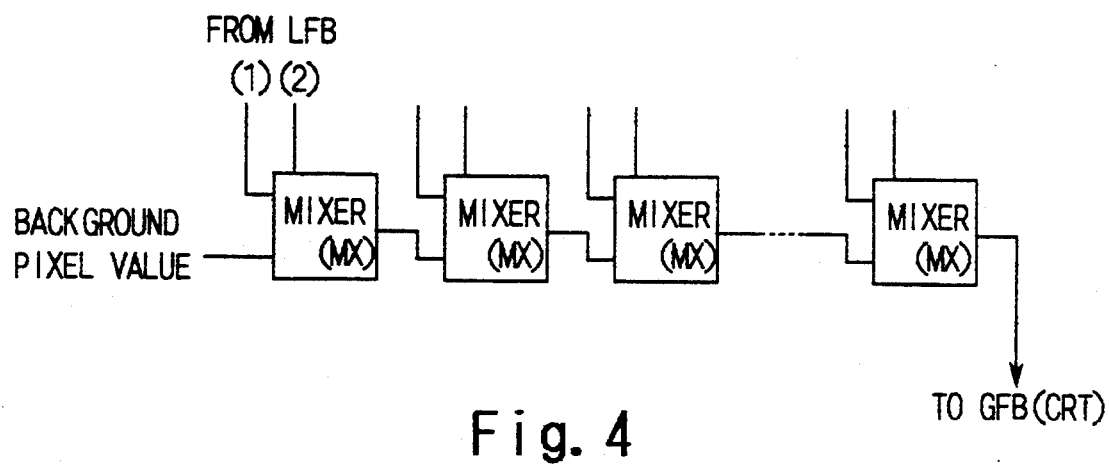
FIG. 4 is a block diagram of the image mixing circuit.

FIG. 4 is a block diagram of the image mixing circuit.

This circuit has a function that pixel values successively fed from each local frame buffer LFB are mixed and sent to a CRT display or the global frame buffer GFB.

Figure 5:
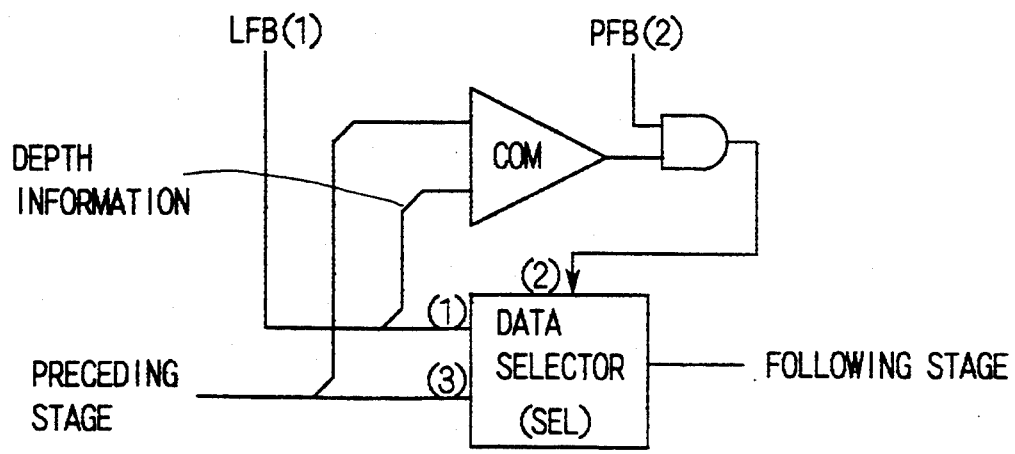
FIG. 5 is a block diagram of the mixer MX.

A mixer MX is defined for each local frame buffer LFB, with every mixer being connected in series. Each mixer MX mixes two pixel values. For example, in the image generation method of Z-buffer process, the mixer MX mixes two pixel values by outputting the smaller one in depth value, where depth represents distance from a view point FIG. 5 is a block diagram of the mixer MX. The mixer MX is provided with a comparator COM and a data selector SEL. The terminal 1 is connected to the output terminal of the parallel-serial converter PS, and the terminal 3 is connected to the output terminal of the preceding mixer. The data selector SEL selects the terminal 1 or the terminal 3 as an activated input terminal according to data of the terminal 2. The data inputted to the selected terminal is outputted to the following mixer. The AND value of the output signal of the comparator COM and the IM non-assigned signal (LFB (2)) is given to the terminal 2 of the data selector SEL. Therefore, if the IM non-assigned signal is activated so that the AND gate is closed, the data selector SEL selects the terminal 3, and thereby the previous value (inputted value to the terminal 3) going through the data selector. If the AND gate is opened, the smaller pixel value in depth data is selected out of the two compared values to thereby output it to the following mixer.

The image mixing process in the above circuit is carried out in a pipeline manner as follows.

First, data including background color information and infinity depth information is inputted into the first (the left-most) mixer MX at the timing t(1), and the pixel value of the upper-left corner of the screen is read from the first (the left-most) local frame buffer LFB at the same time. The mixing result of the first mixer MX is supplied to the second mixer MX. While in the second LFB, the pixel value of the upper-left corner of the screen is read at the timing t(1), but in the first local frame buffer LFB, the next pixel value of the place located next to the upper-left corner of the screen is read at the same time. That is, every scanning counter SC deviates by one bit. This pipeline process allows the mixer MX to transfer all values of one screen in a time of $wp+(n-1)*p$, where w is the number of pixels, p is a pipeline pitch, and n is the number of processors.

In the process of the patch assignment in the frame buffer, it may be possible that all areas of the image memory IM are used, and therefore no more free areas for the assignment are left. In that case, if the global frame buffer GFB is used, the new assignment process can be done after the contents of the local frame buffer LFB are transferred to the global frame buffer GFB. If the global frame buffer GFB is not used, image data handled by a processor is transferred to another processor by use of a communication manner between processors, and thereby the new assignment process can be performed.

As described above, in this image data processing device, every processor can write image data into any area on the screen, and no access conflict between the processors occurs. This enables the device to, in drawing and rendering a polygon model divide a whole, to work into several works and assign them to processors. In an application like an animation modeling which needs to generate successively many images from one model, polygon data is loaded once into a local memory of a processor. Therefore, no more data communication is required so that considerable performance improvement can be expected, compared with the prior art in which whole data of a polygon is broadcasted to every processor for each image generation work of one screen.

What is claimed is:

1. An image data processing device having a multiprocessor, the device carrying out write and read operations, comprising:
   a plurality of processors for processing image data;
   a plurality of local frame buffers, each coupled to a different one of the processors and including a patch table, an image memory, and means including a scanning counter for inputting address data during the read operation;
   display means for displaying the processed image data on a screen thereof; and
   image mixing means for mixing image data outputted from the local frame buffers periodically and transferring the mixed data to the display means;
   wherein each of the plurality of local frame buffers includes demand paging means for assigning a memory unit of predetermined size to only a portion of the screen accessed by one of the plurality of processors to which the local frame buffer is coupled.

2. An image data processing device having a multiprocessor, according to claim 1, wherein said screen of the display means is divided into a plurality of rectangular areas and the predetermined size of said memory unit corresponds to each of the rectangular areas.

3. An image data processing device having a multiprocessor, according to claim 2, wherein said patch table consists of a plurality of patches with each patch corresponding to the rectangular area, for storing an assigning situation for said rectangular areas.

4. An image data processing device having a multiprocessor, according to claim 3, wherein said patch stores information regarding an access to a portion of the screen by the one of the plurality of processors and address information of a memory unit assigned to the portion of the screen accessed by the one of the plurality of processors.

5. An image data processing device having a multiprocessor, according to claim 4, wherein each of the plurality of processors provides screen address information and each of the plurality of local frame buffers includes address converting means for converting screen address information provided by the one of the plurality of processors to which the local frame buffer is coupled into a patch number designating a patch location in said patch table means and into a memory address of the assigned memory unit.

6. An image data processing device having a multiprocessor, according to claim 3, wherein said demand paging means includes means for dynamically assigning the memory unit to any of the plurality of patches.

7. An image data processing device having a multiprocessor, according to claim 1, wherein said memory unit is allocated from the local frame buffer.

8. An image data processing device having a multiprocessor, according to claim 1, wherein said memory unit is sized to exponentiation of two.

9. An image data processing device having a multiprocessor, according to claim 1, further comprising a global frame buffer for storing image data mixed by said image mixing means.

10. An image data processing device having a multiprocessor, according to claim 1, wherein said image mixing means comprises a plurality of mixers connected in series and each of which is connected to each of the plurality of local frame buffers, each of the plurality of mixers mixing output data from a preceding mixer with output data from the local frame buffer connected thereto and outputting the mixed data to a following mixer.

11. An image data processing device having a multiprocessor, according to claim 9, wherein each of said plurality of local frame buffers includes scanning count means for counting addresses on said screen, and each scanning count means counts by respectively deviating by one bit.

12. An image data processing device having a multiprocessor, according to claim 1, further including means for flexibly assigning different portions of the screen accessed by the plurality of processors to the plurality of local frame buffers.

13. An image data processing device having a multiprocessor, according to claim 1, wherein the demand paging means includes means for dynamically assigning each of a plurality of memory units of predetermined size to different portions of the screen.

14. An image data processing device having a multiprocessor, according to claim 1, wherein the image memory stores image information corresponding to patches accessed by one of the plurality of processors to which the local frame buffer is coupled.

15. An image data processing device having a multiprocessor, comprising:
   a plurality of processors for processing image data;
   a plurality of local frame buffers, each coupled to a different one of the processors and including a patch table and an image memory;
   display means for displaying the processed image data on a screen thereof; and
   image mixing means for mixing image data outputted from the local frame buffers periodically and transferring the mixed data to the display means;
   wherein each of the plurality of local frame buffers includes demand paging means for assigning a memory unit of one of the plurality of processors to which the local frame buffer is coupled, and the patch table includes means for storing screen access information and a pointer to the image memory for each of a plurality of patches into which the screen of the display means is divided.

16. An image data processing device having a multiprocessor, according to claim 15, wherein the image memory stores image information corresponding to patches accessed by one of the plurality of processors to which the local frame buffer is coupled.

* * * * *